United States Patent [19]

Lauderdale

[11] Patent Number: 4,632,180
[45] Date of Patent: Dec. 30, 1986

[54] POTABLE WATER HEAT EXCHANGER

[76] Inventor: Robert J. Lauderdale, 25924 Peterman Ave., Hayward, Calif. 94545

[21] Appl. No.: 836,055

[22] Filed: Mar. 4, 1986

[51] Int. Cl.⁴ .......................... F28F 11/00; F24H 1/22
[52] U.S. Cl. ........................................ 165/70; 122/32; 126/435; 237/19; 165/132
[58] Field of Search ..................... 165/70, 132; 237/19; 126/361, 362, 435; 122/32

[56] References Cited

U.S. PATENT DOCUMENTS

| 2,016,746 | 10/1935 | Ireland | 122/32 |
| 2,285,998 | 6/1942 | Morrison et al. | 237/19 |
| 2,889,139 | 6/1959 | Hedberg | 165/132 |
| 3,278,122 | 10/1966 | Laing | 237/19 |
| 3,451,473 | 6/1969 | Vrie et al. | 165/70 |
| 3,469,623 | 9/1969 | Rawlings | 165/70 |
| 3,825,061 | 7/1974 | Bathia | 165/70 |
| 4,054,981 | 10/1977 | Bridgegum . | |
| 4,249,597 | 2/1981 | Carey | 165/70 |
| 4,428,106 | 1/1984 | Campbell et al. | 165/70 |
| 4,517,959 | 5/1985 | Riley | 165/70 |

FOREIGN PATENT DOCUMENTS

| 629462 | 10/1961 | Canada | 165/132 |
| 408518 | 4/1934 | Denmark . | |
| 50297 | 6/1935 | Denmark | 165/132 |
| 2412807 | 8/1979 | Fed. Rep. of Germany | 165/70 |
| 532357 | 2/1922 | France | 237/19 |
| 1125175 | 8/1968 | United Kingdom | 165/70 |
| 1145513 | 3/1969 | United Kingdom | 165/70 |

Primary Examiner—Albert W. Davis, Jr.

[57] ABSTRACT

This indirectly heated potable water tank makes available an appliance meeting all the requirements for safe potable water and gives the consumer a device with a high continuous output of hot water, even when demand is high. The improved device contains the following improvements:

(1) vented double sided metal sheet heat exchangers which result in a significant increase in the temperature of the water, (2) vented heat exhanger tubes as a further means to heat the water, (3) a corrugated metal heat exhange sheet in the vent space to transfer heat through its surface to the water, and (4) a vented potable water temporary storage reservoir where the heated reservoir walls additionally heat the stored water. The properties of the sheet heat exchangers result in a very large inner and outer areas of heat exchange in contact with the water to be heated and the heating fluid and in a narrow inner flow space heating surface and large heat exchanger plates which results in the highest heat extraction from the externally heated water.

5 Claims, 20 Drawing Figures

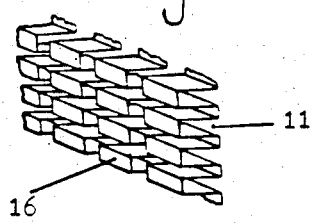
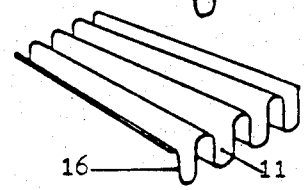
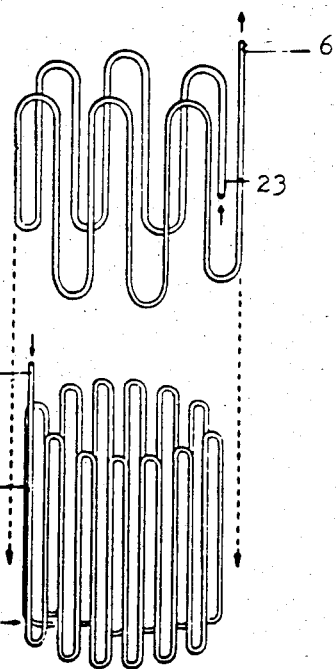
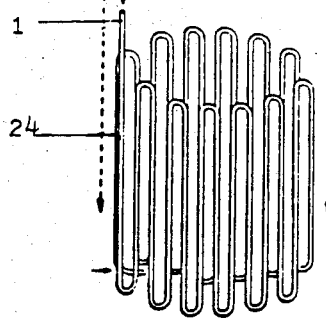
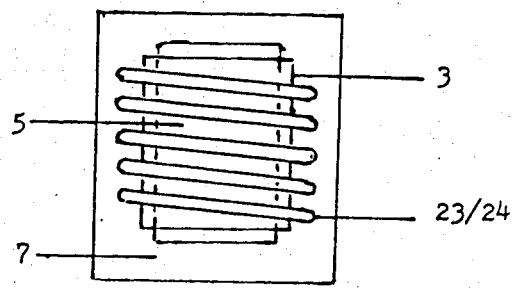

POTABLE WATER HEAT EXCHANGER

TECHNICAL FIELD

My invention relates to heating potable consumption water by an indirect means, with a storage tank to temporarily store the hot water until it is drawn off the reservoir by the consumer.

This invention will ensures that a constant supply of hot water is available to the consumer by providing the means of large heat exchanger surfaces, heating the water before it enters and exits the said reservoir, where it receives additional heating from the storage tank walls.

BACKGROUND ART

Prior to this invention the output flow from vented indirectly heated potable water tanks was very limited and required a long time to reheat the replaced used water.

DISCLOSURE OF INVENTION

The invention is to provide large heat exchanger surfaces to heat the potable water before it enters and exits the storage tank reservoir by using input and output heat exchangers, and further heating the stored stored water with the reservoir tank walls.

The heat exchange is provided by the means of a vented double sided metal sheet heat exchanger, exchangers or vented pipes, pipes or any combination thereto, providing a high constant flow of hot water to the consumer and a short reheating time if the water demand has been very excessive.

The efficiency of the heating methods, removes the need for any other installed heating make up devices.

BRIEF DESCRIPTION OF DRAWINGS

The details of my invention are described in relation to the accompanying drawings and contained in the embodiments:

FIG. 13 and FIG. 14 illustrate alternatively disposed heat exchanger tubes.

FIG. 15 illustrates a combination of the heat exchange coil and metal sheet heat exchangers.

Similar references represent corresponding characters in the explanation of the drawings and description.

DESCRIPTION AND PREFERRED EMBODIMENTS

Figure 1:
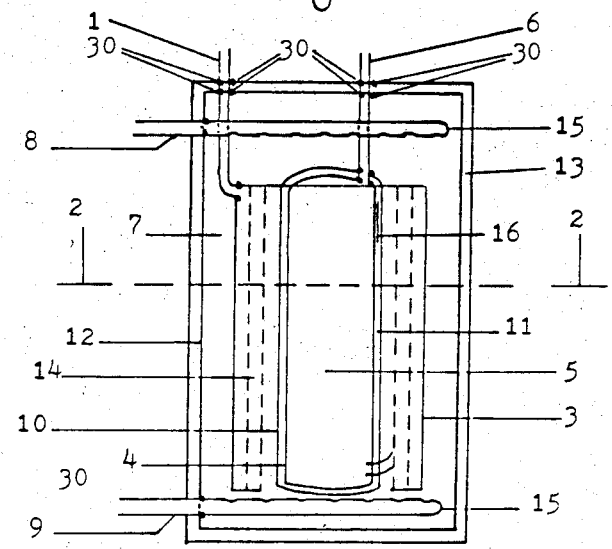
FIG. 1 illustrates a plan view of the indirectly heated potable water tank, also referred to as the appliance, the drawing shows, the inner tank as the storage reservoir 4, the input sheet heat exchanger 3, the outer indirect heated water tank 12 with a boiler water distribution pipe and return boiler water outlet pipe 15. The air space vent tank is indicated by 10.

The invention is further explained with reference to the embodiments and shown in the accompanying drawings:

Referring to the plan view of FIG. 1, the illustration comprises of three tanks with the innermost potable water reservoir tank 4 wherein this tank temporarily stores the water and provides additional heat to the potable water with the heated tank walls.

The reservoir tank is surrounded by a vent space tank 10 providing the means of a safety air gap to separate the fluids contained in the reservoir tank and the boiler water 7.

The outer boiler water tank 12 surrounds the vent space tank and contains externally heated boiler water providing the sole means to heat the potable water in the reservoir tank, heat exchangers, pipes and tubes. The said tanks are of any shape or size and disposed on any axis.

Figure 12:
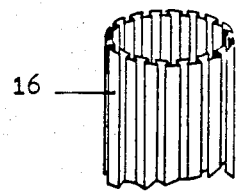
FIG. 12 shows the heat exchanger metal sheet formed to fit into the air space of the vent tank and the FIGS. 12a and 12b, show alternative heat exchanger elements.

The air space vent tank 10 hereinafter referred to as the vent tank requires a means to overcome the insulating effect of the air gap 11 and still retain the safety air space. This is achieved by the insertion of the heat exchange elements 14, shown here as a metal heat exchanger sheet 16, into the vent tank between the adjacent tank walls. As shown a metal heat exchanger sheet is comprised of elements which are fully illustrated in FIG. 3 and in FIGS. 12a and 12b. The sheet is in flush contact with the adjacent tank walls, providing the means for maximum heat transfer between fluids by conduction of heat though the said heat exchanger.

The metal heat exchanger sheet can be in other configurations.

Figure 5:
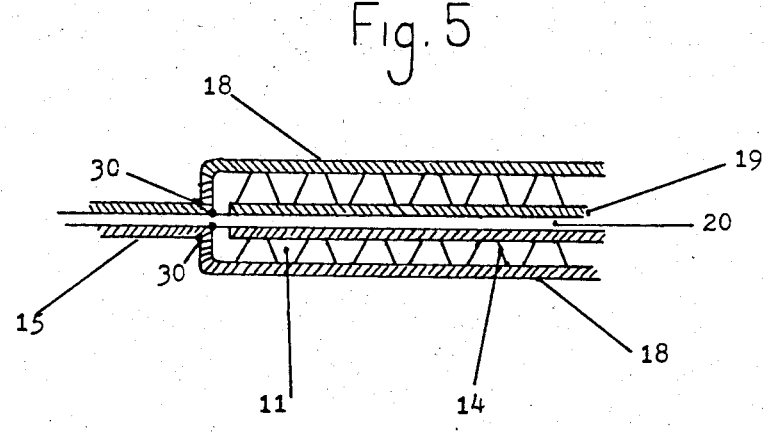
FIG. 5 is the partial cross section of the metal sheet supply heat exchanger illustrating a narrow potable water space 20 and the heat exchange elements 14 inside the sheet heat exchanger.

Illustrated in FIG. 1 is the input metal sheet heat exchanger 3 which has a high heat transfer to the potable water flowing through the heat exchanger, the flow space 20 is narrow as indicated in a clearer manner by referring to FIG. 5.

This flow space results in maximum heat transfer for the cold water as we have a small volume of water flowing over large heat transfer surfaces 18.

Figure 4:
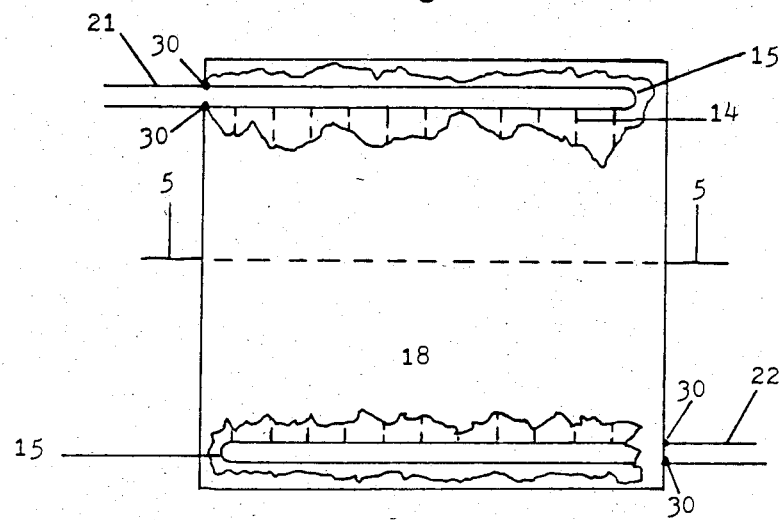
FIG. 4 illustrates a portion of the supply metal sheet heat exchanger with a cut away section showing the tubes to distribute and collect the potable water.

The metal sheet heat exchanger immersed in the boiler water is spirally disposed so that a maximum length is contained within said water tank, a double sided heat transfer surface is show by 18 of FIGS. 4 and 5, wherein the heat exchange sheet elements being indicated by 14, of FIG. 4, and the partial cross section of FIG. 5.

The input heat exchanger can be disposed on any axis and in any configuration.

The input and outlet of the boiler water tank 8 and 9 of FIG. 1 use the means of pipes to distribute and collect the boiler water in the tank by the pipes indicated as 15. With the same means used to distribute the water in the heat exchanger sheets, all the pipes have sealed ends with entry and exit water flow holes along the length, the pipes are shown as 21 and 22 of FIG. 4.

The pipes can be in any configuration and disposed on any axis.

Figure 8:
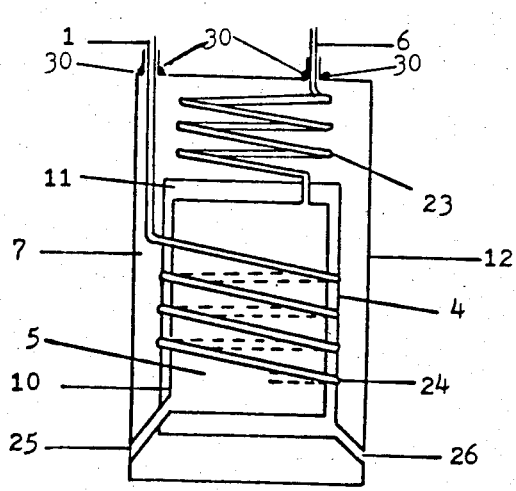
FIG. 8 is the second sectioned view of the indirectly heated water storage tank with vented heat exchanger pipes.
Figure 9:
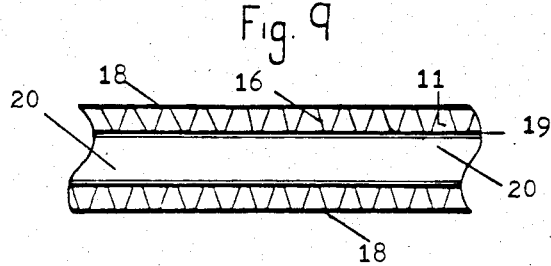
FIG. 9 is a partial cross section view of a heat exchanger pipe showing triangular heat exchange elements herein.
Figure 10:
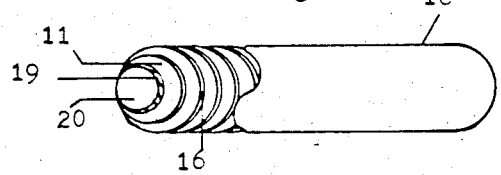
FIG. 10 shows a length of heat exchanger pipe with a section of the outer sheath removed to show spiral heat exchange elements.
Figure 11:
FIG. 11 is a partial cross sectional view of the metal heat exchanger sheet.

Shown in FIG. 8 is the reservoir tank drain tube 25 and vent tank drain pipe 26.

Encasing the outer boiler water tank 12 is a insulated coating 13 to minimize atmospheric heat loss.

The water flow and the heating function, commences at the supply input pipe 1 of FIG. 1, where the cold supply waters enters the supply pipe and into the input metal sheet heat exchanger 3 of FIG. 8.

The input heat exchanger causes a significant increases of the temperature of the supply water before it flows into the storage reservoir 10 where it is additionally heated by the reservoir tank walls.

When the hot water is drawn off by the user, the water exits the reservoir tank to the building plumbing through outlet pipe 6.

The externally heated boiler water 7 enters the outer tank through inlet pipe 8 exiting the said tank when it requires reheating through outlet pipe 9.

The boiler water is the sole heating source for the potable water requiring the boiler water is kept at a temperature between 180 to 190 degrees Fahrenheit.

Figure 7:
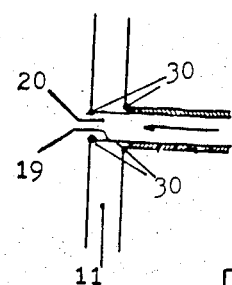
FIGS. 7 and 7a illustrates the method of connecting the vents of the vented tubes and the heat exchangers into the vent tank.
Figure 7A:
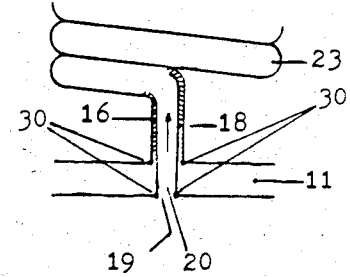

Indirectly heated potable water storage tanks are controlled by codes to protect the consumers health, one requirement is that an air space must separate the fluids so that any deterioration of the walls that separate the fluids cannot cause cross contaminate the potable water, said air space is referred to as the vent space and shown as 11 in FIGS. 1, 2, 3, 5, 8, 9, 10, and 11. The reference number 30 indicates the areas where vent spaces are mated into vent space as shown in FIGS. 7 and 7a.

Figure 2:
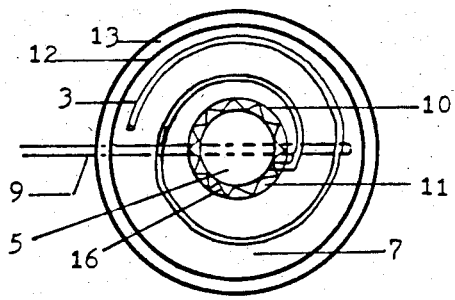
FIG. 2 is the cross section of the appliance shows how the input metal sheet heat exchanger is disposed in a spiral so that a maximum area of sheet is used.
Figure 3:
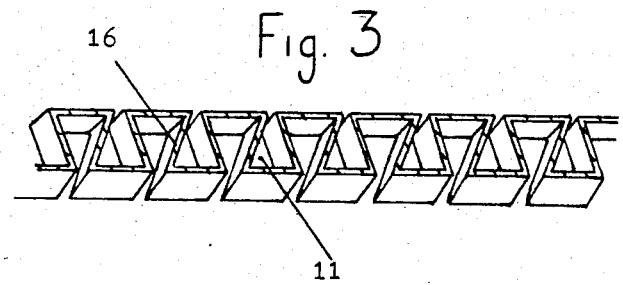
FIG. 3 shows the input heat exchanger elements contained in the vent tank.

The air space vents are indicated by 11 of FIG. 2, FIG. 3, FIG. 5, and the vent tank 10 enclosing the metal heat exchanger sheet 16.

The partial cross section of the vented input heat exchanger sheet FIG. 5, is further explained, wherein both outside plates, 18, of the said sheet are immersed in the boiler water.

One of the advantages is providing the means to double the area of surface contact with the boiler water for a given length of heat exchanger.

With the narrow potable water flow space shown by 20 a small volume of water is in contact with the internal surface plates 19 and the heat transfer elements 14 have minimum width so that the outer plates 18 are as close as possible to the inner potable water flow plates 20 maximizing heat transfer between the fluids.

Figure 6:
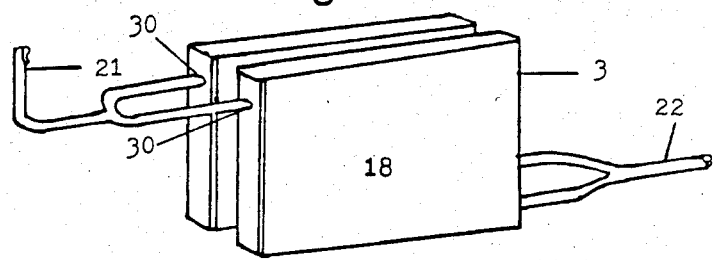
FIG. 6 shows the method of connecting more than one input or output metal sheet heat exchanger.

The vented sheet heat exchangers of FIG. 6 or vented pipe heat exchangers 23 or 24 of FIG. 8 and FIG. 15 can be configured in any shape and disposed on any axis.

This invention is not restricted to having a reservoir tank and input and output heat exchangers. It may suffice for the heat exchangers to be the only means of heating if an high initial hot water flow is not needed. If air space venting is not a requirement for supplying the hot water, then the device may be non-vented indirectly heated water tanks.

In FIG. 15 the combination of heat exchanger sheet 3 with pipe heat exchangers 23 or 24 either can be used as input or output heat exchangers to suit requirements.

Figure 16:
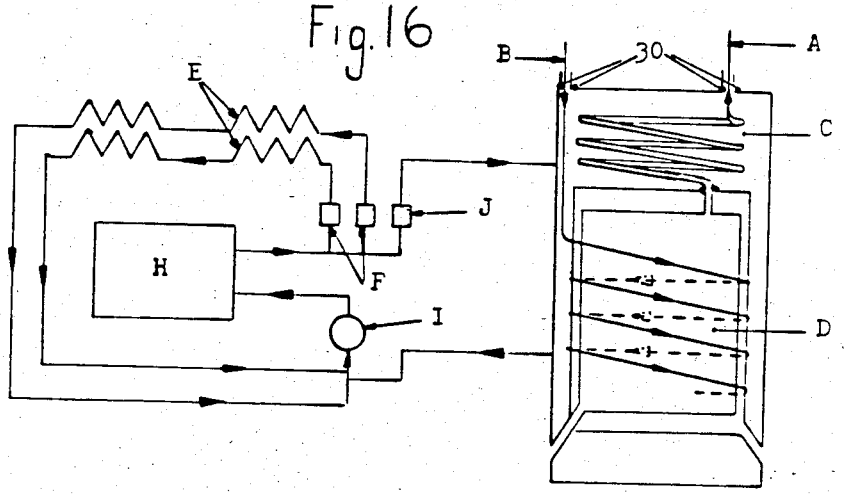
FIG. 16 is a flow diagram showing the invention connected to the external heating source.
Figure 17:
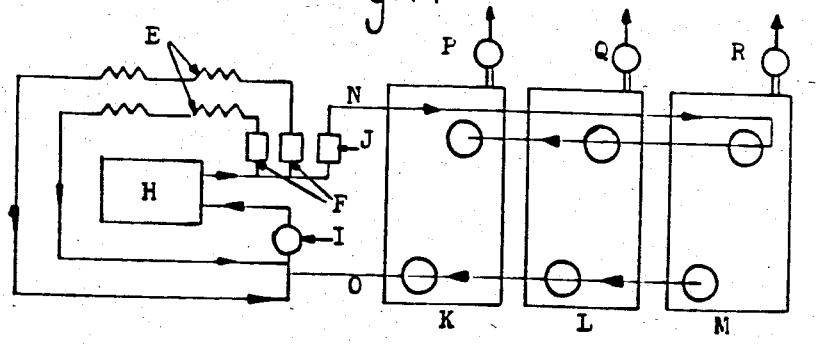
FIG. 17 shows a parallel arrangement as a means to supply hot water to different areas or at other temperatures.

Hereinafter the illustrations shown in FIG. 16 and FIG. 17 are flow chart drawings to describe the installations where the indirectly heated water tank may be used, and now the elements are identified by alphabetical lettering.

The description of FIG. 16 shows the flow of heated water from heater H where the flow follows the arrows as indicated, flowing through the zone valve J. The zone valve will only allow water to flow if the water in the outer tank C requires reheating. The boiler water C returns to H through the circulator pump I with this cycle continuing to maintain the temperature of said water C.

The building heaters are indicated by E. The heating can be controlled by zone valves which can provide different levels of heating to either branch of the building.

The supply consumption water enters the appliance at B and exits to the consumers hot water at A.

In FIG. 17, the hot water follows the path as described in FIG. 16, but the illustration shows the appliance tanks L, M, and K, connected in parallel with each tank provided with a water mixing valve indicated as P, Q, and R which controls the output heat or can be the means to provide water at different temperatures to other areas or locations. When used together, a greater cumulative hot water output flow rate can be obtained.

What is claimed is:

1. An indirectly heated potable water heater heated by boiler water providing a high output flow rate with complete safety, comprising, an outer heated boiler water tank, one or more vented metal sheet heat exchangers contained within said tank and heated by the boiler water, said one or more sheet heat exchangers being connected to vented pipes, whereby a highly efficient high flow rate potable water heater is provided.

2. An indirectly heated potable water heater, a device of claim, 1, further comprising, a metal vented reservoir in said tank for temporarily storing and heating the potable water contained therein, said reservoir being interconnected in series with said vented metal sheet heat exchangers by vented pipes.

3. An indirectly heated potable water heater, a device of claim, 2, wherein two or more vented metal sheet heat exchangers in parallel are interconnected with said vented metal reservoir.

4. An indirectly heated potable water heater, a device of claim, 2, wherein two or more vented metal sheet heat exchangers in series are interconnected with said vented metal reservoir.

5. An indirectly heated potable water heater, a device of claim, 2, wherein said vented metal reservoir is interconnected in series between vented metal sheet heat exchangers.

* * * * *